O. S. SELLS.
BUTT REMOVER FOR CORN HUSKERS.
APPLICATION FILED JAN. 12, 1917.

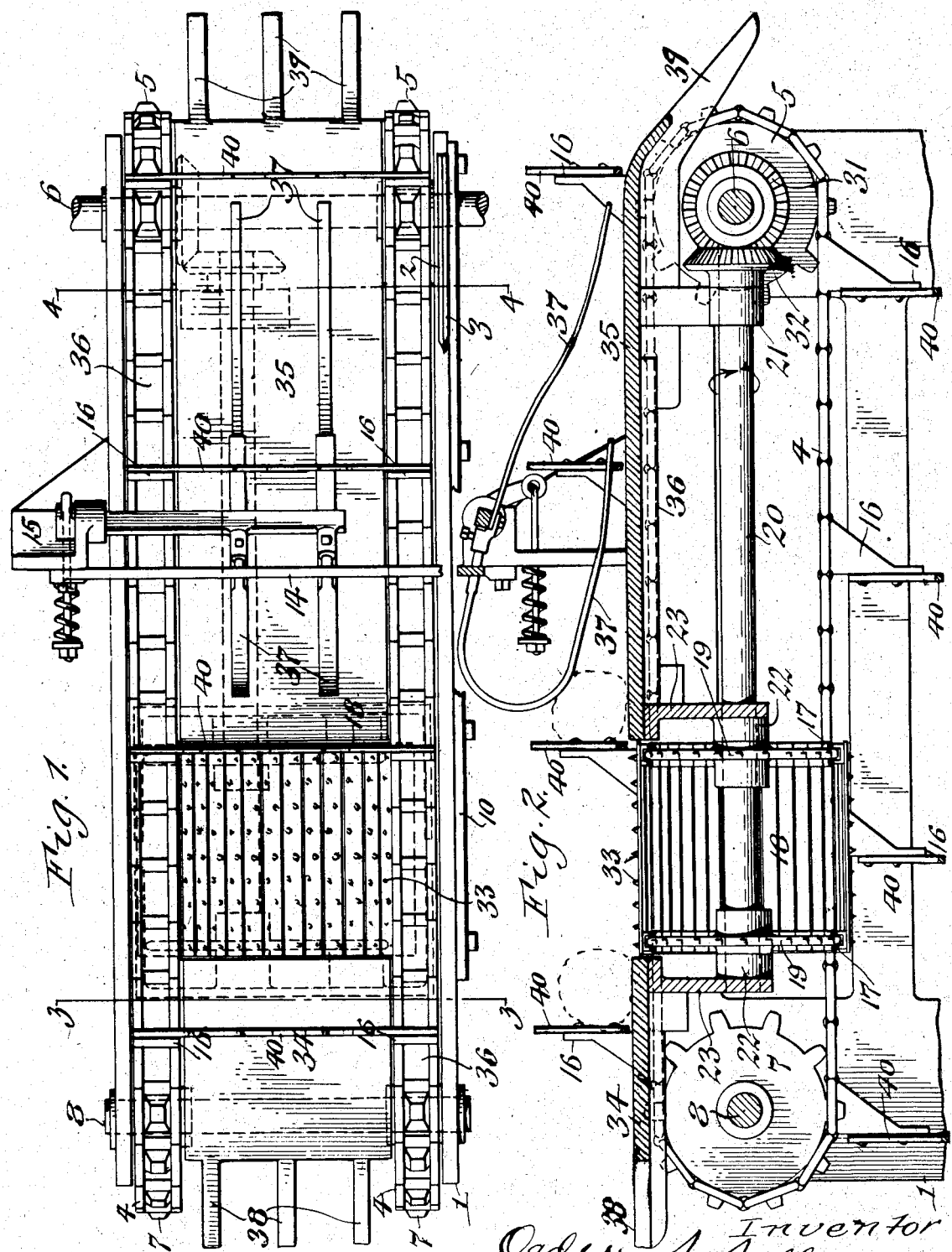

1,333,639.

Patented Mar. 16, 1920.
2 SHEETS—SHEET 2.

Inventor
Ogden S. Sells
By Geyer & Poppe
Attorneys

UNITED STATES PATENT OFFICE.

OGDEN S. SELLS, OF BUFFALO, NEW YORK, ASSIGNOR TO PEERLESS HUSKER CO., OF BUFFALO, NEW YORK, A COPARTNERSHIP.

BUTT-REMOVER FOR CORN-HUSKERS.

1,333,639.  Specification of Letters Patent.  Patented Mar. 16, 1920.

Application filed January 12, 1917. Serial No. 142,081.

*To all whom it may concern:*

Be it known that I, OGDEN S. SELLS, a citizen of the United States, residing at Buffalo, in the county of Erie and State of New York, have invented new and useful Improvements in Butt-Removers for Corn-Huskers, of which the following is a specification.

This invention relates to a device for removing the butt ends of ears of corn before the same are presented to the devices which remove the husks therefrom.

It is the purpose of this invention to provide simple and reliable means whereby this may be accomplished efficiently, economically and expeditiously, so that all the ears of corn will be presented in a definite position relative to the cutting mechanism and have the proper amount of the butt removed therefrom regardless of whether the operator places the ears of corn in the proper position on the means which convey the ears to the cutter mechanism.

Figure 5:
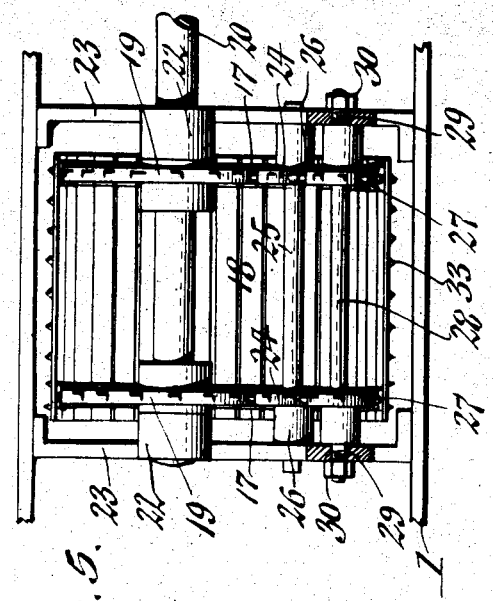
Figure 4:
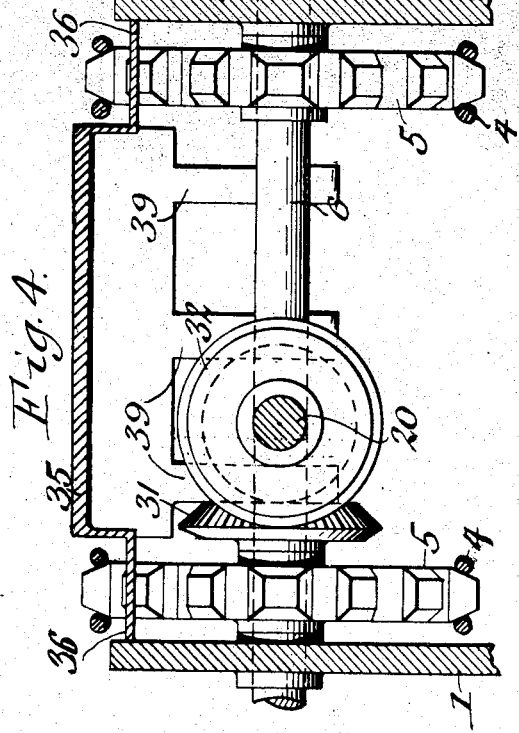
Figure 3:
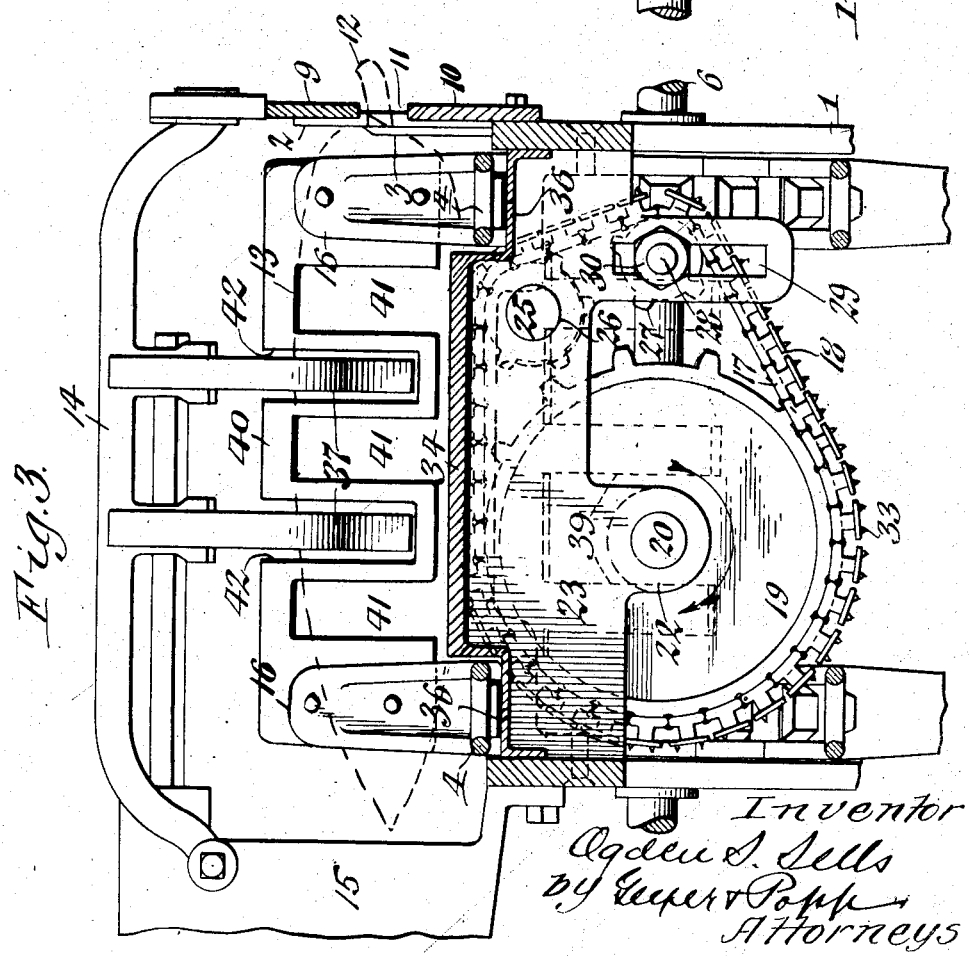

In the accompanying drawings:

Figure 1 is a top plan view of a butt remover embodying the preferred form of my invention. Fig. 2 is a vertical longitudinal section of the same. Figs. 3 and 4 are vertical transverse sections, on an enlarged scale, taken on the correspondingly numbered lines in Fig. 1. Fig. 5 is a fragmentary bottom plan view, partly in section, of the means whereby the ears of corn are positioned relatively to the cutter preparatory to removing the butts therefrom.

Similar characters of reference indicate corresponding parts throughout the several views.

1 represents the main frame of the machine which may be of any suitable construction to support the different working parts. On the front end of this frame is arranged a cutter past which the ears of corn are moved in a crosswise position relative to the devices which convey the same so as to engage the butts of the ears with this cutter and cause the butts to be removed from the ears. Although this cutter may be variously constructed, that shown in the drawings preferably comprises upper and lower cutters or blades 2, 3 which are arranged in the path of the butt ends of the ears as the latter are moved past the cutter. The conveyer whereby the ears are thus moved is preferably of the endless type and comprises two chain belts 4, 4, which have their upper operative stretches arranged lengthwise of the machine and moving forwardly. The cutter is arranged on one side of the delivery portion of this endless conveyer. At their front or delivery turns these conveyer belts pass around a pair of front sprocket wheels 5, 5, which are mounted on a horizontal transverse front shaft 6, while the rear or receiving turns of these belts pass around a pair of rear receiving sprocket wheels 7, 7, which are mounted on a rear horizontal shaft 8. These shafts may be journaled in the main frame in any suitable manner and operated by power in a variety of ways, for instance, by applying a driving belt to a pulley on the front shaft. Before the ears of corn reach the cutter the butt ends of the ears are moved bodily crosswise of the longitudinal movement of the conveyer for the purpose of engaging the butt ends of the ears with a gage and determining the amount of material which is to be cut from the butt ends of the ears. This gage preferably consists of a pair of upper and lower longitudinal gage bars 9, 10, which are arranged along one side of the endless conveyer and at a distance outwardly from the cutter and separated from each other by an intervening longitudinal slot 11 through which the stem 12 of the ears 13 may project while the upper and lower parts of the butts of the ears engage with the upper and lower gage bars. These gage bars may be supported in any suitable means, for instance, the lower gage bar may be secured to the main frame on one side of the ear conveyer while the upper gage bar is supported by means of an overhanging arm 14 mounted on a bracket 15 secured to the opposite side of the main frame, as shown in Figs. 1, 2 and 3.

The operator places the ears on the receiving rear part of the conveyer in a crosswise position relative to the latter and then these ears are moved forwardly by means of wings or flights 16 projecting outwardly from the chains of the conveyer. During the forward movement of the ears with the conveyer and before the same reach the cutter, a positioning device operates upon the ears and moves the same laterally, so that their butt ends engage with the gage. This positioning device is so organized that the same engages with the undersides of the ears of corn during their forward movement with the conveyer but leaves the same still in engagement with the conveyer wings so that the ears are moved transversely with their butt ends into engagement with the gage bars at the same time that they are moved forwardly lengthwise of the machine. In its preferred form, this positioning device comprises an endless carrier which has its upper operative stretch moving horizontally and transversely between the upper stretches of the two conveyer belts and toward the gage bars. This endless carrier preferably comprises two chain belts 17, 17, which are arranged side by side in a direction lengthwise of the machine and connected at intervals by a plurality of slats or bars 18, so that the carrier in effect produces a substantially continuous apron. The receiving turns of the carrier belts pass around two large sprocket wheels 19, 19, which have their axes arranged horizontal and lengthwise of the machine and are mounted on a horizontal longitudinal shaft 20 which is journaled at its front end in a bearing 21 on the main frame and at its rear end in bearings 22 formed in brackets 23 secured to the main frame. The delivery turns of the carrier belts pass around a pair of small delivery sprocket wheels 24 which are mounted on a horizontal longitudinal shaft 25 journaled in suitable bearings 26 on the brackets 23. The lower inoperative stretches of the carrier belts pass around a pair of tightening sprocket wheels 27 which are mounted on an arbor 28 which is adjustably secured at its opposite ends in vertical slots 29 of the brackets 23 by means of clamping nuts 30, by which means slack or wear in the carrier belts may be taken up. Motion may be transmitted to the endless carrier in any suitable manner, for instance, by means of a pair of intermeshing gear wheels 31, 32, secured respectively to the front conveyer shaft 6 and the longitudinal shaft 25 carrying the receiving sprocket wheels of the carrier belt. When the ears reach the positioning carrier they will be moved crosswise against the gage as well as lengthwise of the machine, so that the ears are properly positioned for permitting the butts of the same to be cut as the ears of corn continue their longitudinal movement with the conveyer belts after clearing or passing beyond the positioning device.

The slats of the positioning carrier are preferably provided on their outer surfaces with spurs or teeth 33 which enable the slats to obtain a firm hold on the ears of corn and insure crosswise movement of the same against the gage. If the ears engage the gage before they clear the positioning carrier during the forward movement of the conveyer, then the teeth or spurs 33 operate to loosen or shred the husk and thus permit subsequent complete removal thereof to be effected more easily.

In order to aid in guiding and supporting the longitudinal conveyer belts and the ears of corn which are propelled by the same, a supporting table is provided which preferably comprises a flat rear section 34 arranged between the operative stretches of the conveyer belts in rear of the positioning carrier and a flat front section 35 arranged between the operative stretches of the longitudinal conveyer belts in front of the positioning carrier. These table sections therefore bridge the spaces between the front and rear parts of the operative stretches of the conveyer belts and support the ears of corn while the same are being moved forwardly lengthwise of the machine. These table sections have their upper surfaces arranged above the upper surfaces of the operative stretches of the conveyer belts so that the latter do not engage the underside of the ears of corn, whereby the latter are only supported on their undersides by the rear table section, transverse carrier, and front table section, in passing lengthwise through the machine, leaving the work of moving the ears of corn over these table sections and positioning carrier to the propelling wings of the conveyer belts which engage with the rear sides of the ears.

On opposite sides of the table sections are arranged a pair of horizontal longitudinal rails or shelves 36, 36 which are engaged by the undersides of the operative stretches of the conveyer belts and retain the same in their proper position. These guide rails are preferably offset downwardly and arranged below the level of the table sections, as shown in Fig. 3. These rails are preferably formed integrally with these table sections and mounted on the adjacent parts of the main frame in any suitable manner.

After the ears of corn have passed forwardly beyond the positioning carrier they are retained in engagement with the gage bars preparatory to removing the butt ends thereof by a retaining device which may consist of a plurality of springs 37 which are adapted to bear against the upper sides of the ears of corn and which may be mounted on the main frame of the machine in any suitable manner. After the butts are removed from the ears of corn the same are discharged at the front or delivery turns of the conveyer belts to a husking mechanism of any suitable construction.

At its rear or receiving end of the feed table the same is provided with a plurality of longitudinal receiving guide bars 38 upon which the ears of corn to be husked may be placed in a crosswise position preparatory to being engaged by the wings of the conveyer and at the front or delivery end of the table the same is provided with a plurality of longitudinal guide bars 39 which direct the trimmed ears of corn from the feed table to the devices which remove the husks therefrom. The corresponding front and rear guide bars are lengthwise in line with each other but lengthwise out of line with the longitudinal springs 37 which yieldingly engage the ears of corn and hold the same down on the table while moving forwardly over the same. In order to increase the engagement of the conveyer with the ears of corn the corresponding wings of the conveyer belts are connected by cross bars 40 each of which is adapted to bear with its front or advancing side against the rear side of the ears and provided on its inner edge with notches 41 arranged in line with the springs 37 for clearing the same and on its outer edge with notches 42 in line with the guide bars 38, 39 for clearing the latter in passing around the front and rear ends of the table.

The positioning device forming part of this butt remover can be operated with a minimum expenditure of power, the same is not liable to get out of order and it positively shifts all the ears of corn against the gage so as to insure proper removal of the butts thereof by the cutter.

I claim as my invention:

1. A butt remover for corn huskers comprising a feed table, a gage arranged on one side of said table, a cutter arranged adjacent to said gage, retaining springs arranged lengthwise above the table and operating to hold the ears of corn yieldingly against the top of the table, and means for conveying said ears lengthwise of said table gage and cutter and comprising longitudinal belts, and cross bars connecting said belts at intervals and provided with notches in their outer edges in line with said springs for clearing the latter.

2. A butt remover for corn huskers comprising a feed table provided at its end with longitudinal guide bars, a gage arranged along one side of said table, a cutter arranged adjacent to said gage, and means for conveying ears of corn over said table and past said gage and cutter comprising longitudinal belts, and cross bars connecting said belts at intervals and provided with notches in their inner edges and in line with said guide bars for clearing the latter.

3. A butt remover for corn huskers comprising a feed table provided at its end with longitudinal guide bars, a gage arranged along one side of said table, a cutter arranged adjacent to said gage, longitudinal retaining springs arranged above the table out of line with said guide bars, and means for conveying the ears of corn lengthwise over said table and guide bars and past said gage and cutter comprising longitudinal belts and cross bars connecting the belts at intervals and provided at their outer edges with notches in line with said springs for clearing the same and at their inner edges with notches in line with said guide bars for clearing the latter.

OGDEN S. SELLS.